April 19, 1960  O. ZALDASTANI ET AL  2,933,146
STRUCTURAL MATERIAL
Filed Jan. 26, 1956
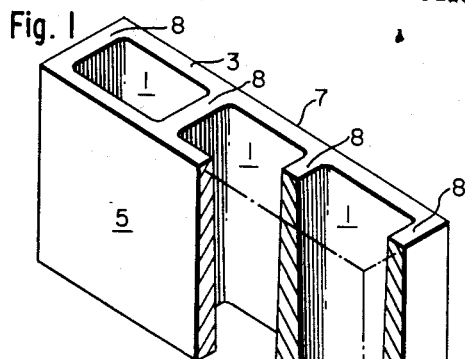
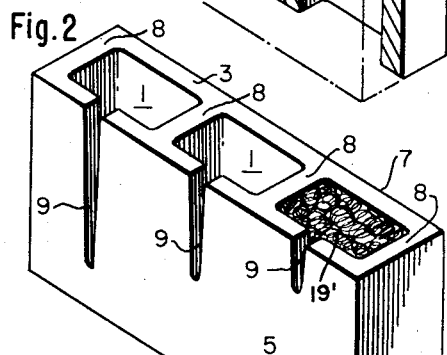
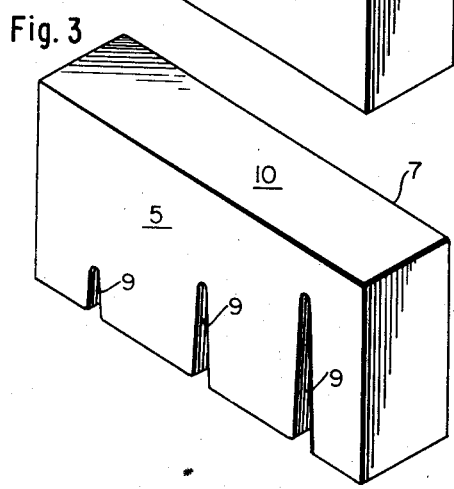
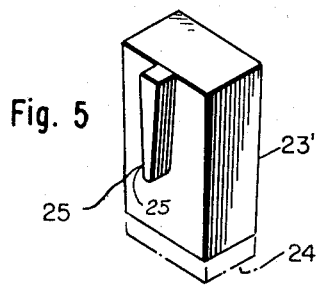
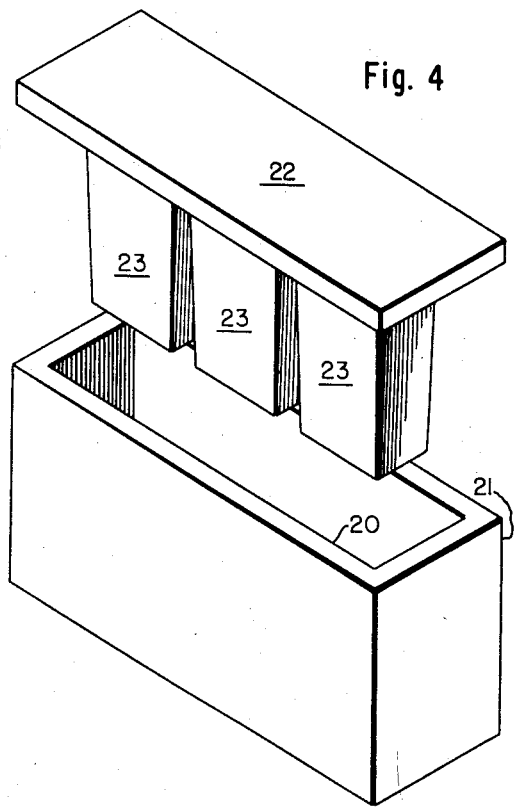
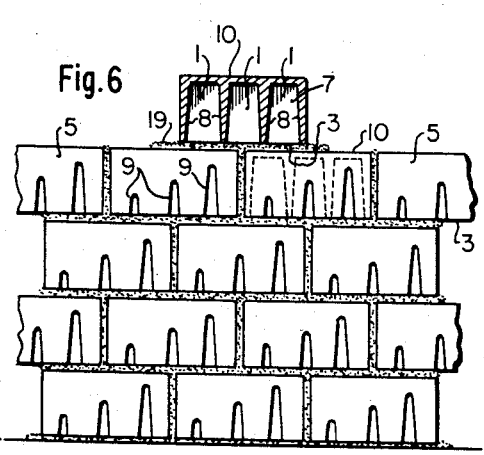
INVENTORS
OTHAR ZALDASTANI
MIGUEL C. JUNGER
BY
ATTORNEYS

United States Patent Office 2,933,146
Patented Apr. 19, 1960

2,933,146
STRUCTURAL MATERIAL

Othar Zaldastani, Chestnut Hill, and Miguel C. Junger, Cambridge, Mass.

Application January 26, 1956, Serial No. 561,458

4 Claims. (Cl. 181—33)

The present invention relates to structural materials and more particularly to structural materials embodying sound-absorbing properties.

Most existing materials for sound absorption are made of substances like asbestos, cellulose, or the like, that are unsuitable for structural purposes, either for bearing their own weight or contributing to the structural strength of a building. As a result, the general approach to sound absorption has been to build the structure in question in the ordinary way (with materials like concrete, cinder block, or brick) and then in a separate step to add an acoustical material to the surfaces of the structural partitions. In many cases, even a second additional step has been required, a finishing of the surface (as by furring strips) so that the acoustic material can be attached. Acoustic materials themselves are not cheap and the extra labor for attaching them has often made the absorption of noise a luxury unavailable to many.

It is therefore one object of the present invention to provide structural materials with acoustic properties so that sound absorption is achieved at no cost extra to the ordinary expenses of building.

It is another object of the present invention to provide materials combining structural and acoustic properties whereby the loss of space from attached acoustic material, the danger from falling tiles, and the fire hazard of separate tiles are eliminated, and whereby there is no problem of maintenance for the acoustic materials other than that of keeping the structure itself in good condition.

It is another object of the present invention to provide structural materials with acoustic properties that can be manufactured with no operation additional to those used in the manufacture of ordinary structural materials, whereby the acoustical properties are provided at no extra cost.

In furtherance of these and other objects as will hereinafter appear, the principal feature of the present invention is the introduction of orifices and cavities into ordinary structural materials so that they acquire sound-absorptive properties regardless of their normal acoustic characteristics.

Another feature of the present invention is the introduction of the cavities and orifices in such a way that they do not interfere appreciably with the normal structural strengths of the materials or their sound and thermal insulating properties.

A third feature is the use of orifices in the shape of long slots opened at one end, as opposed to orifices with a closed cross-section.

These and other features of the invention will appear from the accompanying drawings in which:

Fig. 1 is a pictorial view of an ordinary construction block with one corner broken off to show the structure;

Fig. 2 is a pictorial view of a block made according to the invention;

Fig. 3 is a pictorial view of a block made according to the invention, shown in its normal position in a wall turned upsidedown from its position in Fig. 2.

Fig. 4 is an exploded view of the mold and plungers used to manufacture an ordinary construction block;

Fig. 5 shows the modified form of the mold plunger for manufacturing a block according to the invention; and Fig. 6 is an orthographic view of a wall made with blocks according to the present invention, one block shown in section.

Fig. 1 shows a construction block of a common type made of concrete, cinder concrete, or the like. The block is made of a front thickness of material 5 and a back thickness 7 joined by webs 8 to form holes 1 running through thet top surface 3 to the corresponding under surface, the holes being for the purpose of lessening the weight of the block without altering its effectiveness for its structural purpose as a partition block. The holes 1 also give the block thermal insulating properties by creating dead air space in the wall. A partition is constructed of these blocks by placing mortar on the top surface 3 and stacking the blocks one on top of the next to form courses with layers of mortar between them.

According to the present invention we provide a block having the desirable thermal insulating and structural properties of the conventional block, but with the additional property of sound absorption. Moreover, the modified block is manufactured in exactly the same way as the conventional construction block. To these ends, the improved block is shaped in general like the block of Figs. 2 and 3. There are two differences between the block according to the invention and the ordinary construction block of Fig. 1. First, the holes 1 which serve to reduce the weight of the block, do not go all the way through the block as a comparison of Fig. 2 with Fig. 3 will show. There is an unrelieved portion of the structural material shown at 10 in Fig. 3 that seals off the ends of the holes 1, so as to form volume-enclosing chambers. Second, orifices 9 are provided leading from the wall surface 5 of the block to these chambers. These orifices are made in the shape of slots extending from the top surface 3 partway down the wall surfaces of the block.

A wall made of such blocks is shown in Fig. 6. By reason of the partitions 10, the weight-reducing holes 1 do not penetrate the top surfaces of the blocks, so that the stacked blocks (see Fig. 6) include a number of closed cavities, each formed by a hole 1 on the top surface of the block beneath (or, more properly, the mortar 19 on the top surface 10). In the wall surface 5 of each block (which is assumed to be the side facing the noise to be absorbed), orifices 9 are provided, leading into the cavities. These orifices are slots in shape. The orifices 9 are small enough so that they do not affect the structural properties of the blocks. The blocks so constructed absorb sound impinging on their surfaces 7 in three ways.

The first is by a Helmholtz resonator effect. The air in the cavity 1 is compressible and acts as a spring to vibrate the mass of air in the orifices 9, thus forming a mechanical resonant circuit. Sound energy is absorbed at the resonant frequency through friction losses involved in the motion of the air in the orifices against the material of the orifice walls. Although the orifices occupy only a small part of the surface 5 facing the sound-emitting area, the brick is almost completely permeable to the incident sound if the distance between orifices is small compared to the wavelength of the sound (according to the well-known acoustical principle that objects smaller than the wavelength of a sound wave cast no "shadow"). The resonant frequency at which absorption takes place is determined by the volume of air in the cavity (V) and the volume of air in the orifices (v), and the cross-sectional area A of the orifice, according to the formula $$f = 2160 \frac{A}{(vV)^{1/2}}$$

where $f$ is the resonant frequency and all quantities are expressed in inches. The volume of the cavity is determined by the dimensions of the conventional sizes of construction blocks. The total volume of the orifices is determined by the resonant frequency desired. The resonant frequency should be in the lower region of the audible noise spectrum (below 1000 cycles), because other effects operate at higher frequencies. The number and size of the slots (given a certain total volume determined from the desired resonant frequency) are set by the amount of damping required. Damping causes the absorption to take place over a band pass of frequencies, but less effectively than at the undamped resonance. There will be a certain amount of damping which produces optimum results for a particular case. The number and size of slots are selected to give this amount of damping, a large number of small slots giving large damping, a small number of large slots giving less damping. The roughness of the block material must also be taken into account, since the damping results from air friction against the orifice walls. A smaller cross-sectional area should be used with a relatively smooth material (like terra cotta) to achieve the same damping as that given by a rough material like cinder concrete with larger orifices. A typical block is made of concrete, outside dimensions 4 x 8 x 16 in., and has three cavities each about 36 cu. in. Each cavity has one slot opening it to the noise-facing surface. The slots are tapered, but have an average width of 5/16 in. The slots were varied in length to produce a band-pass absorption; one was 1¾ in., one, 3½ in., and one, 5¾ in. Although most structural materials are rough-surfaced enough to give the desired damping, damping may be increased by putting rock wool or other fibrous material in the orifices 9 or in the cavity 1 behind the orifices as at 19' in Fig. 2.

The second way in which the blocks shown in Fig. 2 operate to absorb sound is by the "black body" effect. Sound entering the orifices 9 is reflected back and forth within the cavity formed by the hole 1 and the mortar 19 until its energy is dissipated. This effect takes place ordinarily at frequencies higher than those associated with the Helmholtz action. The time it takes for the "black body" absorption to take place, that is, the number of reflections required, can be decreased, if necessary, by putting rock wool or other fibrous material in the cavities, but most structural materials are sufficiently rough-surfaced to make the "black body" absorption in the cavities effective without further damping.

The combination of orifice and cavity operates in a third way to absorb sound energy. The orifice looks to an entering sound wave as though it ran to the opposite side of the cavity like a continuous tube, and, as such, there is a resonant absorptive effect. For a sound wave of a length such that there is a velocity antinode (maximum air velocity) at the orifice opening sound energy is absorbed by viscous friction against the walls of the orifice. The action absorbs sound at a wavelength four times that of the distance from the opening of the orifice to the flat surface opposing it, that is, at a wavelength $\lambda$ where the distance from the orifice opening to the opposing surface is a $\lambda/4$. Most of the resonance takes place at a wavelength approximately four times that distance, but to a lesser extent also at wavelengths ¾, 5/4, 7/4, etc. times the critical distance.

Figs. 4 and 5 show the method of making the blocks of Figs. 1, 2, and 3. As shown in Fig. 4 the mold for making construction blocks as shown in Fig. 1 consists of two parts, a box 21 and a lid 22. Liquid concrete mix or any other suitable material aggregate which can be made to cohere in a mold is poured into the box 21 and the lid 22 placed on the box. The material hardens into the desired shape by drying, heating, or some other process and is removed from the box. The lid 22 is provided with plungers 23 to make the weight-reducing holes 1 of Figs. 1 and 2. The plungers 23 are long enough to press against the bottom inside surface of the box 21. When the concrete has hardened the lid 22 lifts off the plungers 23 with it, and the resulting block is like that shown in Fig. 1. The plungers 23 are usually tapered for easier removal from the hardened structural material comprising the block.

Fig. 5 shows the only modification necessary to alter the conventional construction block mold of Fig. 4 to make the acoustical block shown in Fig. 2. Only the shape of the plungers 23 is changed. The new type of plunger 23' is shorter, so that its tip does not touch the bottom of the mold box 21. Thus, a web of material 10 (Fig. 3) is left to close the holes 1. The relieved portion of the plunger is shown in dotted lines at 24 in Fig. 5. The plunger 23' is also provided with a projection 25 to make the orifices 9 in the block of Fig. 2. The projection 25 must protrude far enough from the plunger 23' to press against the front inside surface 20 of the mold box 21. Thus, just as the plungers 23 (Fig. 4) of the conventional mold make the holes 1, the projection 25 of the modified mold makes the slots 9. The length, width, or shape of the slots 9 can be varied by varying the length, width, or shape of the projection 25. Usually, both the projection 25 and the modified plunger 23' will be made tapered for easy removal from the hardened material of the block.

Although the block has been described as having three cavities, it should be understood that both the design of the block and its mold are applicable to any number of cavities per block, or, indeed, to any of the wide variety of shapes used in construction blocks. Similarly, only one slot has been shown per cavity, but two or even more slots could be used if desired. Furthermore, the blocks shown in Figs. 2 and 3 are given slots varying in length for each of the three different cavities. The effect of this variation is to produce three different Helmholtz resonances in the audio spectrum. If desired, the slots could be of uniform length.

Having thus described our invention, we claim:

1. A load-bearing structural formation having, in combination, a sound-absorbing block of moldable structural material having a cavity, a pair of opposite closed end walls, third and fourth contiguous closed outer walls each contiguous with each of the end walls, a substantially open side opposite the third wall and extending to the cavity, and a fifth outer wall opposite the fourth wall, having an exposed surface facing in the direction of impinging noise and having a slot therein leading to the cavity, said slot having one end open to said open side and extending in length from the open side part way to the third wall and having a width in the dimension between the end walls that is small in relation to its length and to said dimension, and a member secured to the block and forming a closed wall joined with said pair of walls and with said fourth and fifth walls.

2. A structural formation as in claim 1 in which the width of the slot is tapered with its widest extremity at the open side.

3. The combination of claim 1 with a body of sound absorptive material in the cavity.

4. A load-bearing structural wall formed of superposed courses of sound-absorbing blocks, each block being formed of moldable structural material and having a cavity, a pair of opposite closed end walls, third and fourth contiguous closed outer walls each contiguous with each of the end walls, a substantially open side opposite the third wall and extending to the cavity, and a fifth outer wall opposite the fourth wall, having an exposed surface facing the direction of impinging noise and having a slot therein leading to the cavity, said slot having one end open to said open side and extending in length from the open side part way to the third wall and having a width in the dimension between the end walls that is small in relation to its length and to said dimension, the blocks in one course having their third walls in position to close the open sides of the blocks in an adjacent course.

References Cited in the file of this patent

UNITED STATES PATENTS

| | | | |
|---|---|---|---|
| 1,302,667 | Jones | May 6, | 1919 |
| 1,305,294 | McIntyre | June 3, | 1919 |
| 1,660,745 | Delaney | Feb. 28, | 1928 |
| 1,850,884 | Kissinger | Mar. 22, | 1932 |
| 2,007,130 | Munroe et al. | July 2, | 1935 |
| 2,281,121 | Straight | Apr. 28, | 1942 |
| 2,301,538 | Guyer et al. | Nov. 10, | 1942 |
| 2,532,049 | Wittke | Nov. 28, | 1950 |
| 2,751,659 | Henry | June 26, | 1956 |

FOREIGN PATENTS

| | | | |
|---|---|---|---|
| 889,063 | Germany | Sept. 7, | 1953 |
| 1,066,348 | France | Jan. 20, | 1954 |
| 1,085,605 | France | July 28, | 1954 |
| 1,094,437 | France | Dec. 8, | 1954 |